(12) United States Patent
Kaltenbach et al.

(10) Patent No.: US 9,457,799 B2
(45) Date of Patent: Oct. 4, 2016

(54) HYBRID DRIVE OF A MOTOR VEHICLE AND METHOD FOR OPERATING SAME

(71) Applicant: ZF FRIEDRICHSHAFEN AG, Friedrichshafen (DE)

(72) Inventors: Johannes Kaltenbach, Friedrichshafen (DE); Uwe Griesmeier, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 198 days.

(21) Appl. No.: 14/367,544

(22) PCT Filed: Nov. 5, 2012

(86) PCT No.: PCT/EP2012/071804
§ 371 (c)(1),
(2) Date: Jun. 20, 2014

(87) PCT Pub. No.: WO2013/091971
PCT Pub. Date: Jun. 27, 2013

(65) Prior Publication Data
US 2015/0291154 A1    Oct. 15, 2015

(30) Foreign Application Priority Data
Dec. 21, 2011   (DE) .......................... 10 2011 089 467

(51) Int. Cl.
*B60W 20/30*   (2016.01)
*B60W 20/00*   (2016.01)
(Continued)

(52) U.S. Cl.
CPC .............. *B60W 20/30* (2013.01); *B60K 6/387* (2013.01); *B60K 6/48* (2013.01); *B60W 10/02* (2013.01); *B60W 10/06* (2013.01); *B60W 10/08* (2013.01); *B60W 10/113* (2013.01); *B60W 20/00* (2013.01);
(Continued)

(58) Field of Classification Search
None
See application file for complete search history.

(56) References Cited

U.S. PATENT DOCUMENTS 8,480,535 B2 * 7/2013 Tanba ...................... B60K 6/38
180/338
8,771,135 B2 * 7/2014 Tanba ................... B60W 10/06
477/5

(Continued)

FOREIGN PATENT DOCUMENTS

DE    10 2007 022774 A1    11/2008
DE    10 2007 051991 A1    5/2009
DE    10 2008 041565 A1    3/2010

OTHER PUBLICATIONS

International Search Report issued Apr. 16, 2013 in International Application No. PCT/EP2012/071804.
(Continued)

*Primary Examiner* — Justin Holmes
(74) *Attorney, Agent, or Firm* — Brinks Gilson & Lione

(57) ABSTRACT

A hybrid drive for a motor vehicle includes an internal combustion engine, an electric machine and a transmission. The transmission is a multi-stage shifting transmission having first and second subtransmissions which have first and second input shafts, respectively, and share a common output shaft. The first and second input shafts can be coupled selectively to the common output shaft via form-locking shift elements of the subtransmissions. The first input shaft of the first subtransmission can be coupled to the electric machine via a first clutch, and the second input shaft can be coupled to the internal combustion engine via a second clutch. A drive shaft of the electric machine can be connected to the second input shaft via a form-locking shift element.

20 Claims, 3 Drawing Sheets

Figure 1:
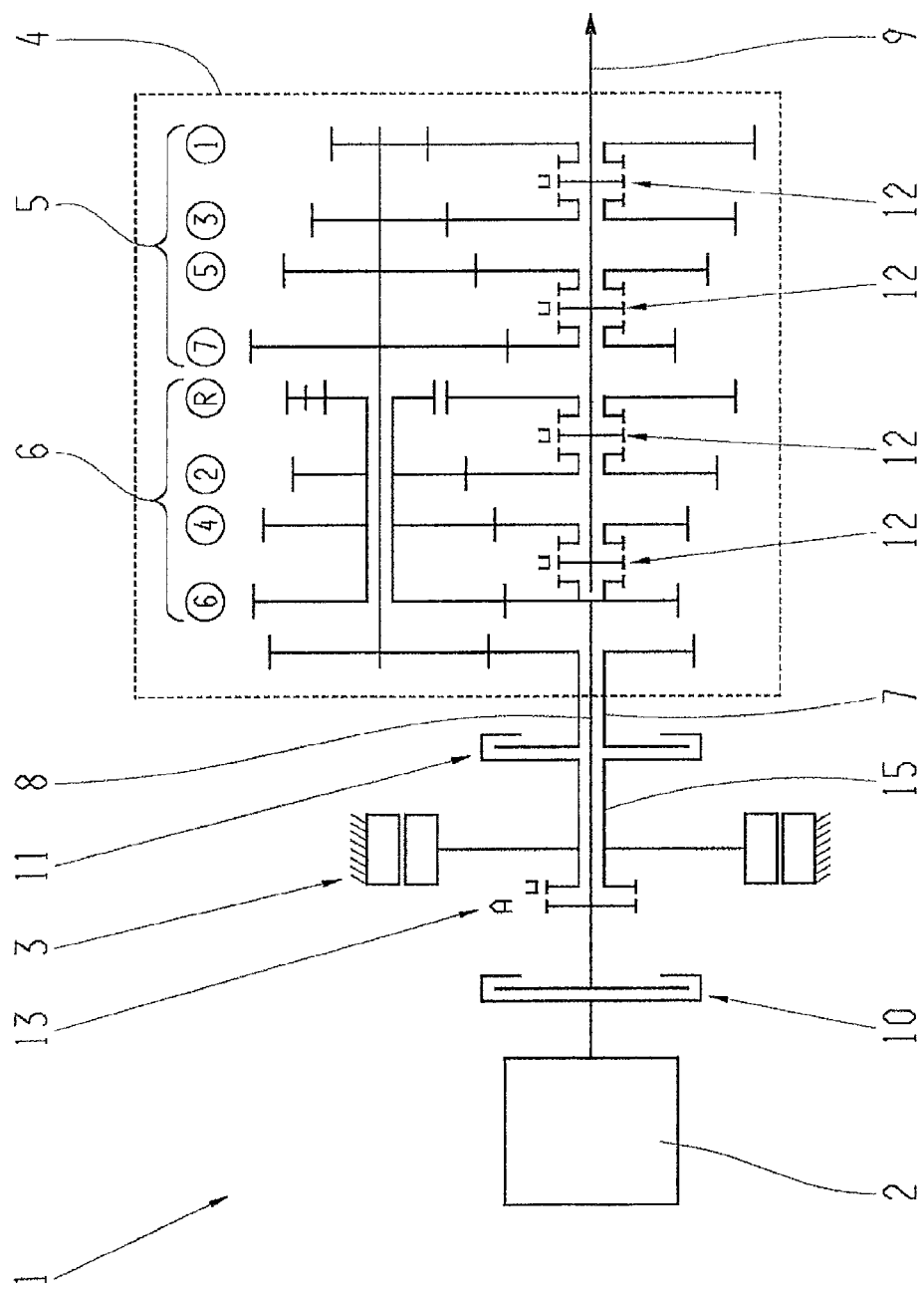

(51) Int. Cl.
  *B60K 6/387* (2007.10)
  *B60K 6/48* (2007.10)
  *B60W 10/02* (2006.01)
  *B60W 10/08* (2006.01)
  *B60W 10/113* (2012.01)
  *B60W 30/19* (2012.01)
  *B60W 10/06* (2006.01)
  *B60W 30/182* (2012.01)
  *F16H 3/097* (2006.01)
  *F16H 3/093* (2006.01)

(52) U.S. Cl.
  CPC ............ *B60W 30/182* (2013.01); *B60W 30/19* (2013.01); *B60Y 2400/421* (2013.01); *B60Y 2400/424* (2013.01); *F16H 3/097* (2013.01); *F16H 2003/0933* (2013.01); *F16H 2200/0056* (2013.01); *Y02T 10/6221* (2013.01); *Y10S 903/914* (2013.01); *Y10S 903/93* (2013.01)

(56) References Cited

U.S. PATENT DOCUMENTS

| 2002/0033059 | A1* | 3/2002 | Pels | B60K 6/24 74/329 |
| 2006/0130601 | A1  | 6/2006 | Hughes | |
| 2011/0054745 | A1* | 3/2011 | Sato | B60K 6/387 701/54 |
| 2011/0174557 | A1* | 7/2011 | Tanba | B60K 6/36 180/65.22 |

OTHER PUBLICATIONS

International Search Report and Written Opinion from corresponding International Patent Application PCT/EP2012/071804, dated Apr. 16, 2013 (German Language).

\* cited by examiner

HYBRID DRIVE OF A MOTOR VEHICLE AND METHOD FOR OPERATING SAME

This application is a filing under 35 U.S.C. §371 of International Patent Application PCT/EP2012/071804, filed Nov. 5, 2012, and claims the priority of DE 10 2011 089 467.5, filed Dec. 21, 2011. These applications are incorporated by reference herein in their entirety.

The invention relates to a hybrid drive for a motor vehicle according to the preamble of Claim 1. Moreover, the invention relates to methods for operating a hybrid drive of this type.

A motor vehicle having a hybrid drive is known from DE 198 50 549 A1, wherein the hybrid drive comprises an internal combustion engine, an electric machine and a transmission designed as a double clutch transmission. The double clutch transmission of the hybrid drive in DE 198 50 549 A1 has two subtransmissions, each of which has a separate input shaft and a common output shaft, wherein, according to this prior art, a friction-locking clutch is allocated to each input shaft, for coupling the internal combustion engine to the respective input shaft of the respective subtransmission. The subtransmissions of the double clutch transmission according to DE 198 50 549 A1 have form-locking shift elements, by means of which the two input shafts can be selectively coupled to the common output shaft. And electric machine is coupled to at least one input shaft of at least one subtransmission.

Base on this, the present invention addresses the objective of creating a novel hybrid drive for a motor vehicle and methods for operating a hybrid drive of this type.

This objective shall be attained by means of a hybrid drive according to claim 1. According to the invention, the first input shaft of the first subtransmission can be coupled to the electric machine via a first friction-locking clutch, such that when the first clutch is engaged, the electric machine is coupled to the first input shaft and thus to the first subtransmission, and when the first clutch is disengaged, the electric machine is decoupled from the first input shaft, and thus from the first subtransmission, wherein the second input shaft of the second subtransmission can be coupled to the internal combustion engine via a second, friction-locking or form-locking clutch, such that when the second clutch is engaged, the internal combustion engine is coupled to the second input shaft, and thus to the second subtransmission, and when the second clutch is disengaged, the internal combustion engine is decoupled from the second input shaft, and thus from the second subtransmission. Furthermore, a form-locking shift element engages with both input shafts, wherein a drive shaft of the electric machine can be connected to the second input shaft via the form-locking shift element.

It is possible, with the hybrid drive according to the invention, using a single electric machine, and thus without a second electric machine, to make use of numerous hybrid functions, i.e. pure electrical driving, without drag losses at a disengaged clutch, pure electrical start-up with slippage via a friction-locking clutch, active synchronization of at least some shift elements via the electric machine, start-up of the internal combustion engine via the electric machine when the motor vehicle is at a standstill, start-up of the internal combustion engine via the electric machine from a pure electric driving mode, without interruption of tractive force, start-up or creep drive from a generator mode of the electric machine, without a delay, and accordingly, a charging mode of the electric machine, execution of power-shiftings using the electric machine as a power-shifting element, and execution of power-shiftings during a pure electrical driving mode, optionally with simultaneous start-up of the internal combustion engine, for example. Furthermore, boosting and recuperation can be provided as hybrid functions. The majority of these functions can then also be executed when the second clutch is designed as a form-locking clutch. Some of the functions require, however, that the second clutch is designed as a friction-locking clutch.

Methods according to the invention for operating a hybrid drive of this type are defined in Claims 7-15.

Figure 2:
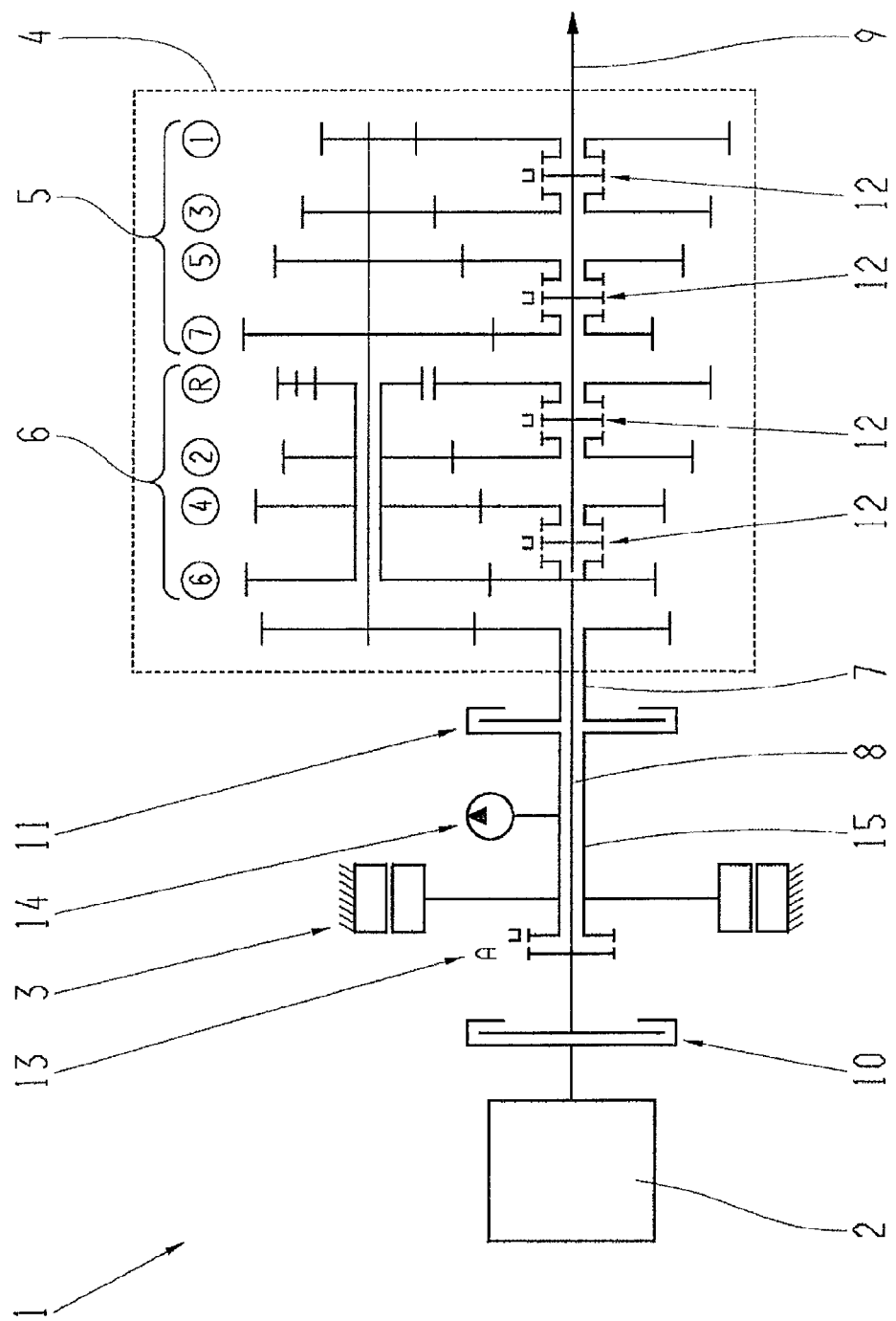
Figure 3:
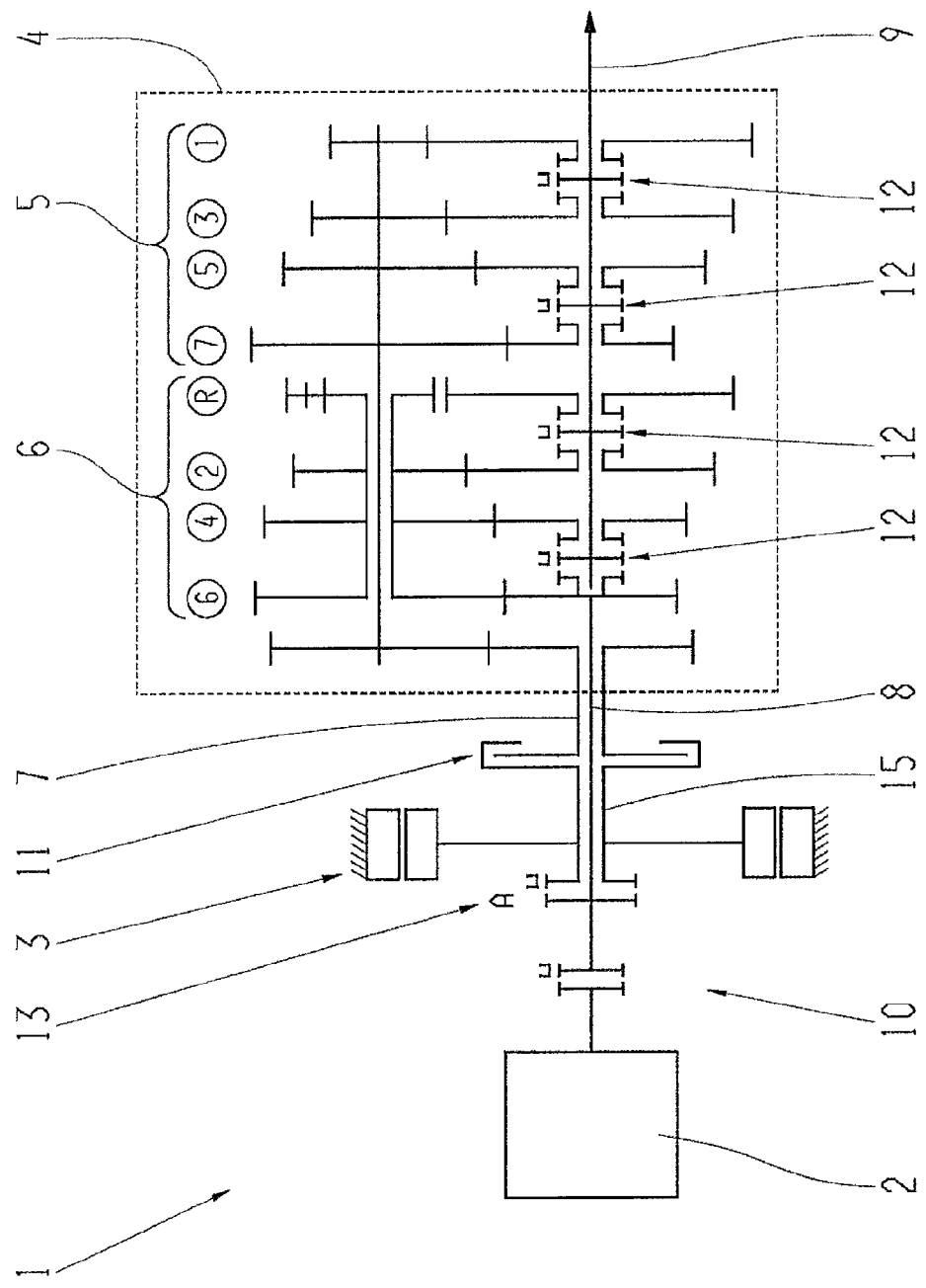

Preferred further developments of the invention can be derived from the dependent Claims and the following description. Embodiment examples of the invention shall be explained in greater detail, without being limited thereto, based on the drawings. Shown are:

FIG. 1 a diagram of a hybrid drive according to the invention, for a motor vehicle;

FIG. 2 another diagram of a hybrid drive according to the invention, for a motor vehicle; and FIG. 3 another diagram of a hybrid drive according to the invention, for a motor vehicle.

FIG. 1 shows a preferred embodiment of a hybrid drive 1 according to the invention, for a motor vehicle, wherein the hybrid drive 1 comprises an internal combustion engine 2, an electric machine 3, and a transmission 4. The transmission 4 is designed as a multi-stage shifting transmission having two subtransmissions 5 and 6, wherein the two subtransmissions 5 and 6 each have a separate input shaft 7 or 8, respectively, and a common output shaft 9.

The first subtransmission 5 of the transmission 4 provides the forward gears "1," "3," "5," and "7" in the embodiment example. In the embodiment example shown, the second subtransmission 6 of the transmission 4 provides the forward gears "2," "4," and "6," and the reverse gear "R,".

The transmission 4, having the two subtransmissions 5 and 6, has, according to FIG. 1, numerous form-locking shift elements, combined to form shifting groups 12, by means of which each of the two input shafts 7 and 8 of the two subtransmissions 5 and 6 can be selectively coupled to the output shaft 9 of the transmission 4, wherein the output shaft 9 of the transmission 4 acts on an output drive.

At this point, it should be noted that in the shown, preferred embodiment example, the two input shafts 7 and 8 of the two subtransmissions 5 and 6 are disposed coaxially to one another.

The electric machine can be coupled to the first input shaft 7 of the first subtransmission 5 of the transmission 4, specifically via a first, friction-locking clutch 11, this being such that when the first, friction-locking clutch 11 is engaged, the electric machine 2 [sic: 3] is coupled to the first input shaft 7, and thus to the first subtransmission 5, and when the first, friction-locking clutch 11 is disengaged, the electric machine 3 is decoupled from the first input shaft 7, and thus from the first subtransmission 5.

The internal combustion engine can be coupled to the second input shaft 8 of the second subtransmission 6, specifically via a second clutch 10, which is designed to be friction-locking in FIGS. 1 and 2, and is designed to be form-locking in FIG. 3, specifically, such that when the second clutch 10 is engaged, the internal combustion engine 2 is coupled to the second input shaft 8, and thus coupled to the second subtransmission 6, and when the second clutch 10 is disengaged, the internal combustion engine 2 is decoupled from the second input shaft 8, and thus decoupled from the second subtransmission 6.

Furthermore, a form-locking shift element 13 is present in the hybrid drive according to the invention, which makes it possible to connect a drive shaft 15 of the electric machine 3 to the second input shaft 8. The form-locking shift element 13 engages with both input shafts 7 and 8 in such a manner that the form-locking shift element 13 engages with the first input shaft 7 between the electric machine 3 and the first clutch 11 and with the second input shaft 8 between the second clutch 10 and the second subtransmission 6.

Then, when the form-locking shift element 13 is engaged, and both clutches 10 and 11 are disengaged, exclusively the electric machine 3 of the hybrid drive is exclusively coupled to the second input shaft 8, and thus coupled to the second subtransmission 6. The internal combustion engine 2 of the hybrid drive is then completely decoupled from the transmission 4, and the electric machine 3 of the hybrid drive is decoupled from the first subtransmission 5 of the transmission 4.

Then, when the first clutch 11 is disengaged, and the form-locking shift element 13, as well as the second clutch 10, are engaged, the electric machine 3 of the hybrid drive and the internal combustion engine 2 of the hybrid drive are coupled to one another, and collectively coupled to the second input shaft 8, and thus coupled to the second subtransmission 6.

Then, when the second clutch 10 is disengaged and the form-locking shift element 13, as well as the first clutch 11, are engaged, the two subtransmissions 5 and 6 of the transmission 4 are coupled to one another, and the electric machine 3 of the hybrid drive is coupled to the two input shafts 7, 8, and thus coupled to the two subtransmissions 5, 6 of the transmission 4.

With the hybrid drive according to the invention, which functions exclusively with a single electric machine 3 and comprises, in addition to the two subtransmissions 5 and 6 of the transmission 4, the two clutches 10 and 11, and a form-locking shift element, a plurality of hybrid functions can provided, which shall be explained in detail below.

As such, a pure electrical driving mode is possible with the hybrid drive 1, without drag losses at a disengaged clutch, for which the hybrid drive 1 is operated such that in the second subtransmission 6, a neutral setting is engaged, the form-locking shift element 13 is disengaged, the first, friction-locking clutch 11 is engaged, and in the first subtransmission 5, a gear is engaged. The second, friction-locking or form-locking clutch 10 can be set to any position. In this case, the electric machine 3 drives via the first subtransmission 5, and provides a drive torque to the output shaft 9, wherein the second clutch 10 does not turn, such that no drag losses occur at the second clutch. This function can be used when the second clutch 10 is friction-locking or form-locking.

Furthermore, a purely electrical start-up is possible with the hybrid drive 1, with slippage via a friction-locking clutch, wherein, subsequently, pure electrical driving, without drag losses at the friction-locking clutch, can take place. For this, a neutral setting is engaged, in turn, in the second subtransmission 6, the shift element 13 is disengaged in turn, the first, friction-locking clutch 11 serves as a start-up element, a gear is engaged in the first subtransmission 5, and the state of the second clutch 10 is arbitrary. In this case, the electric machine 3 provides power via the first clutch 11, which exhibits slippage, and the gear engaged in the first subtransmission 5, wherein the second clutch 10, in turn, does not turn. Then, when the first, friction-locking clutch 11 is engaged, i.e. said clutch engages, the purely electrical start-up procedure is complete, and a pure electrical driving occurs, without any drag losses at the second clutch 10. This purely electrical start-up has the advantage that vibrations between the mass of the electric machine 3 and the mass of the motor vehicle can be avoided, because the first clutch 11, exhibiting slippage, decouples the inertial mass of the electric machine 3. This function can be used when the second clutch 10 is friction-locking or form-locking.

In the case, as is shown in FIG. 2, where an oil pump 14, as secondary assembly, is allocated to the first input shaft 7 of the first subtransmission 5, this secondary assembly can be powered at a defined rotational rate when the motor vehicle is at a standstill. Furthermore, a so-called standstill derating, i.e. a de-excitation of the electric machine 3, due to one-sided loading of an inverter functioning together with the electric machine 3, can be prevented.

The hybrid drive 1 according to the invention furthermore enables an active synchronization of at least some shift elements by means of the electric machine 3. As such, the shift elements combined to form the shifting groups 12 of the first subtransmission 5 and the second subtransmission 6 can be actively synchronized via a regulation of the rotational rate of the electric machine 3, as long as the electric machine 3 is connected to the respective subtransmission. As such, the electric machine 3 can be connected to the first subtransmission 5 via the first clutch 11. The electric machine 3 can be connected to the second subtransmission 6 via the form-locking shift element 13. Because the electric machine 3 can be decoupled from both of the input shafts 7 and 8 of the subtransmissions 5 and 6, all of the shift elements of the subtransmissions 5 and 6 can also be synchronized by other means, for example, by means of a drive, regulated with respect to the rotational rate, of the internal combustion engine 2, when the second clutch 10 is at least partially engaged. This function can be used when the second clutch 10 is friction-locking or form-locking.

The internal combustion engine 2 of the hybrid drive can be started when the motor vehicle is at a standstill, this being both via a direct start-up as well as via a dynamic start. Then, when the internal combustion engine 2 of the hybrid drive 1 is to be started using the electric machine 3, by means of a direct start-up, when the motor vehicle is at a standstill, in the starting state of the hybrid drive 1, the shift element 13 is engaged, a neutral setting is engaged in the second subtransmission 6, a neutral setting is engaged in the first subtransmission 5, and/or the first friction-locking clutch 11 is disengaged, and the second clutch 10 is engaged. In this case, the electric machine 3 can tow-start the stationary internal combustion engine 2 when the motor vehicle is at a standstill. This direct start-up can be used when the second clutch 10 is friction-locking or form-locking.

In order to implement a dynamic start-up of the internal combustion engine 2 while the motor vehicle is at a standstill, the form-locking shift element 13 is engaged in the initial state, i.e. when the motor vehicle is at a standstill, a neutral setting is engaged in the second subtransmission 6, a neutral setting is engaged in the first subtransmission, and/or the first, friction-locking clutch 11 is disengaged and the second clutch 10, also friction-locking in this case, is likewise disengaged in the initial state. Subsequently, the electric machine 3 is accelerated to a defined pulse start rotational rate, wherein, then, when the electric machine 3 has reached this pulse start rotational rate, the second clutch 10 is engaged, in order to start the internal combustion engine 2 by means of a pulse start.

Furthermore, a comfortable starting of the internal combustion engine 2, without interruption of the tractive force, can be implemented from an electrical driving mode, this also being the case at low speeds. In the initial state, i.e. during a purely electrical driving mode, the first, friction-locking clutch 11 is engaged, a gear is engaged in the first subtransmission 5, the second clutch 10, which for this function must be friction-locking, and the form-locking shift element 13, are both disengaged, and a neutral setting is engaged in the second subtransmission 6. In this case, the electric machine 3 then drives the vehicle via the first subtransmission 5. The second friction-locking clutch 10 does not turn, such that drag losses at this clutch can be prevented. In order to start the internal combustion engine 2, the form-locking shift element 13 is first synchronized and engaged, wherein, subsequently, the initially engaged first, friction-locking clutch 11 is brought to a slipping state, specifically by decreasing the transference capacity thereof. Subsequently, the rotational rate of the electric machine 3 is increased, in particular, then, when preceding this, the vehicle was driven electrically at a low speed. The internal combustion engine 2 is then started via the second, friction-locking clutch 10, in that this clutch is at least partially engaged, wherein the first, friction-locking clutch 11 provides a slipping decoupling. As a result, greater comfort is ensured during the start-up of the internal combustion engine. After the tow-start of the internal combustion engine 2 via the second, friction-locking clutch 10, the first, friction-locking clutch 11 is synchronized and engaged, while subjected to load.

Furthermore, a start-up without delays is possible with the hybrid drive 1 according to the invention, starting from a generator mode of the electric machine 3, and accordingly, a charging mode of the electric machine, wherein the form-locking shift element 13 is engaged at this point in the initial state during the generator mode of the electric machine 3, when the motor vehicle is at a standstill, wherein a starting gear is engaged in the first subtransmission 5, wherein a neutral setting is engaged in the second subtransmission 6, wherein the second clutch 10 is engaged and the first, friction-locking clutch 11 is disengaged, or this clutch is engaged only as far as the point of contact. If the electric machine 3 is to be started from this charging mode, then the first, friction-locking clutch 11 is engaged beyond the point of contact, wherein this can occur at any time, without delays. Then, when the friction-locking clutch 11 is completely engaged, the start-up procedure is complete. This function can be used if the second clutch 10 is friction-locking or form-locking.

Then, when the vehicle is to be driven in the purely electrical mode, via the first subtransmission 5, a gear change from a current gear of the first subtransmission 5 to a target gear of the second subtransmission 6 can be carried out with the hybrid drive 1 according to the invention, this preferably being a traction power downshift in the purely electrical operating mode. For this, in the initial state, the form-locking shift element 13 is disengaged, a gear is engaged in the first subtransmission 5, such that the vehicle is driven in a purely electrical mode via the first subtransmission 5, the second subtransmission 6 is in a neutral setting, the first, friction-locking clutch 11 is engaged, and the second clutch 10 is disengaged. The gear change from the current gear of the first subtransmission 5 to the target gear of the second subtransmission 6 is executed such that first, either, according to a first variation, the form-locking shift element 13 is synchronized and engaged, or, according to a second variation, the target gear is synchronized and engaged in the second subtransmission 6. Subsequently, the transference capacity of the first, friction-locking clutch 11 is decreased, in order to bring this clutch to a slipping state, wherein, subsequently, according to the first variation, the target gear is synchronized and engaged in the second subtransmission 6, or, according to the second variation, the form-locking shift element 13 is synchronized and engaged. Subsequently, by means of further decreasing the transference capacity of the first, friction-locking clutch 11, this clutch is entirely disengaged, such that the load is conducted via the second subtransmission 6. Subsequently, if desired, the current gear can be disengaged in the first subtransmission 5, in order to prevent drag losses in the first, friction-locking clutch 11. The first, friction-locking clutch 11 can subsequently remain disengaged, or can be engaged. Analogously, a dynamic power upshift, from a current gear of the first subtransmission 5 to a target gear of the second subtransmission 6 can be executed. This function can be used if the second clutch is friction-locking or form-locking.

Furthermore, with a purely electrical operation of the hybrid drive, shifting from a current gear of the second subtransmission 6 of the transmission 4, to a target gear of the first subtransmission 5 of the transmission can occur, preferably a traction power upshifting, wherein for this the form-locking shift element 13 is engaged in the initial state, a gear is engaged in the second subtransmission, in order to drive via the second subtransmission 6, wherein a neutral setting is engaged in the first subtransmission, wherein the second clutch 10 is disengaged, and the first, friction-locking clutch 11 is either disengaged or engaged. In order to then execute a power shifting, in particular the traction power upshifting, in the purely electrical mode, from the second subtransmission 6 to the first subtransmission 5, if the first, friction-locking clutch 11 is not already disengaged, then this clutch is disengaged and subsequently the target gear is synchronized and engaged in the first subtransmission 5. Subsequently a load transference occurs by means of at least partially engaging the first clutch 11 through increasing the transference capacity thereof, with the help of the first, friction-locking clutch 11, this being until the second subtransmission 6 is no longer subject to a load. Subsequently the current gear is then disengaged, without load, in the second subtransmission 6. Subsequently, the first, friction-locking clutch 11 is synchronized while subject to load, such that this clutch is then engaged. With this process a traction upshifting from the second subtransmission 6 to the first subtransmission 5 of the transmission 4, in the form of a power shifting, is possible during the electrical operating mode. In an analogous manner, a dynamic power downshifting from a current gear of the second subtransmission 6 to a target gear of the first subtransmission 5 can also be executed. This function can be used if the second clutch 10 is friction-locking or form-locking.

A fraction power upshifting and a dynamic power downshifting are identical here in terms of the sequence, with only the algebraic signs for the torque being reversed. Likewise, a traction power downshifting and a dynamic power upshifting are identical here in terms of the sequence, with only the algebraic signs for the torque being reversed.

Furthermore, a gear change from a current gear of the second subtransmission 6 to a target gear of the first subtransmission 5, in the manner of a fraction power upshifting, can occur with a simultaneous start-up of the internal combustion engine 2, wherein, for this, the form-locking shift element 13 is engaged in the initial state, a gear is engaged in the second subtransmission 6, in order to be able to drive in a purely electric mode via the second subtransmission 6, wherein a neutral setting is engaged in the first subtransmission 5, wherein the second clutch 10, which must be friction-locking for this function, is disengaged, and wherein the first, friction-locking clutch 11 is either disengaged or engaged. In order to execute the power shifting, first the target gear is synchronized and engaged in the first subtransmission 5, wherein, subsequently, via the first, friction-locking clutch 11, through continuous increasing of the transference capacity thereof, this clutch is at least partially engaged, in order to implement a load transference via the first, friction-locking clutch 11, and to free the second subtransmission 6 of any load. As soon as the second subtransmission 6 is free of load, the current gear in the second subtransmission 6 can be disengaged. Subsequently, the first, friction-locking clutch 11 is synchronized, while subjected to load, wherein the internal combustion engine 2 is simultaneously tow-started via the second, friction-locking clutch 10, in that the second clutch 10, which must be friction-locking in this case, is at least partially engaged. For this, the inertia of the electric machine 3 is used for starting the internal combustion engine 2, wherein a slippage decoupling from the output drive, or the output shaft 9, respectively, is ensured by means of the first, friction-locking clutch 11, for purposes of increasing comfort. After a sufficient starting rotational rate has been reached in the internal combustion engine 2, the second clutch 10, which must be friction-locking in this case, is again disengaged, such that the internal combustion engine 2 can then continue the start-up process under its own power. Subsequently, the first, friction-locking clutch 11 is further synchronized and engaged.

It should be noted at this point that the gear allocation of the gears to the subtransmissions 5 and 6 of the transmission 4 can differ from that shown in FIG. 1. It is therefore not absolutely necessary that the first subtransmission 5 provides odd gears, and the second subtransmission 6 provides the even gears. In order to ensure a power shifting capability via the electric machine 3, the gears of the respective subtransmissions, i.e. the first subtransmission 5 in the embodiment example shown here, should not be directly adjacent to one another.

As already explained above, the internal combustion engine 2 can be entirely decoupled from the transmission via the second clutch 10. The second clutch 10 enables a tow-start of the internal combustion engine 2 from the electrical driving mode, if this clutch is designed as a friction-locking clutch. Furthermore, the internal combustion engine 2 can be completely decoupled while subject to load, such that with a full braking, for example, a stalling of the internal combustion engine 2 can be avoided.

The internal combustion engine can furthermore be coupled to the electric machine 3 via the second clutch 10 and the form-locking shift element 13. The form-locking shift element 13 enables thereby the use of the gears of the first subtransmission 5 by the internal combustion engine 2 via the engaged form-locking shift element 13. The electric machine 3 can be coupled to the second subtransmission 6 via the form-locking shift element 13. A purely electric driving mode, without drag losses at a disengaged, friction-locking clutch, is possible when the form-locking shift element 13 is disengaged. This function can be used when the second clutch 10 is friction-locking or form-locking.

The interaction of the first, friction-locking clutch 11 and the form-locking shift element 13 enables a start-up of the electric machine 3 from the charging mode, without delay. Likewise, a start-up of the internal combustion engine during an electric power shifting is possible as a result. Furthermore, a slippage decoupling during a tow-start of the internal combustion engine 2 as far as the output drive can be implemented by this means. Furthermore, the interaction of the first, friction-locking clutch 11 and the form-locking shift element enables a purely electrical power shifting, wherein the friction-locking clutch 11 functions as a power shifting element.

Furthermore, with a hybrid drive according to the invention, or with a motor vehicle having a hybrid of this type, respectively, power shiftings can be executed using the electric machine 3 as the power shifting element. Thus, a torque can be provided at the output drive of the motor vehicle during a load-free gear shifting in the second subtransmission 6 of the transmission 4, when the form-locking shift element 13 is disengaged, by means of the electric machine 3 via a gear of the first subtransmission 6 [sic: 5].

A power shifting in the first subtransmission 5 with the participation of the electric machine 3 as a power shifting element only occurs then, when the internal combustion engine 2 provides an output drive torque via the second subtransmission 6.

In order to execute a gear shifting from a current gear of the first subtransmission 5 to a target gear of the first subtransmission 5, using the electric machine 3 as a power shifting element, starting from an internal combustion engine driving mode of the motor vehicle, while the clutches 10, 11 are engaged, and while the form-locking shift element 13 is engaged, first, a load to the electric machine 3 is built up, and the load to the internal combustion engine 2 is decreased, the form-locking shift element 13 is disengaged, and, optionally, the second clutch 10 is disengaged. Subsequently, an intermediate gear of the second subtransmission 6 is synchronized and engaged. Following this, the load to the electric machine 3 is decreased, and the load to the internal combustion engine 2 is increased, and the second clutch 10 is engaged, if this clutch was previously disengaged. Following this, the current gear of the first subtransmission 5 is disengaged, and the target gear thereof is synchronized and engaged, wherein, subsequently, the load to the electric machine 3 is increased, and the load to the internal combustion engine 2 is decreased, and, optionally, the second clutch 10 is disengaged. Subsequently, the intermediate gear of the second subtransmission 6 is disengaged, and the form-locking shift element 13 is synchronized and engaged. Following this, the load to the electric machine 3 is decreased and the load to the internal combustion engine 2 is increased, and, optionally, the second clutch 10 is engaged. This function can be used when the second clutch 10 is friction-locking, or when the second clutch 10 is form-locking.

In order to execute a gear shifting from a current gear of the first subtransmission 5 to a target gear of the second subtransmission 6, using the electric machine 3 as a power shifting element, starting from an internal combustion engine driving mode of the motor vehicle, with the clutches 10, 11 engaged, and with the form-locking shift element 13 engaged, in the manner of a power shifting from the internal combustion engine 2 to the electric machine 3, the load to the electric machine 3 is first increased, and the load to the internal combustion engine 2 is decreased, the form-locking shift element 13 is disengaged, and, optionally, the second clutch 10 is disengaged, wherein, following this, the target gear of the second subtransmission 6 is synchronized and then engaged. Subsequently, in the manner of a power shifting from the electric machine 3 back to the internal combustion engine 2, the load to the electric machine 3 is decreased, and the load to the internal combustion engine 2 is increased, and, optionally, the second clutch 10 is engaged, wherein, subsequently, the current gear of the first subtransmission 5 is disengaged. This function can be used when the second clutch 10 is friction-locking, or when the second clutch 10 is form-locking.

In order to execute a gear shifting from a current gear of the second subtransmission 6 to a target gear of the first subtransmission 5, using the electric machine 3 as a power shifting element, starting from an internal combustion engine driving mode of the motor vehicle, with the clutches 10, 11 engaged, and the form-locking shift element 13 disengaged, first, the target gear of the first subtransmission 5 is synchronized and then engaged, subsequently, in the manner of a power shifting from the internal combustion engine 2 to the electric machine 3, the load to the electric machine 3 is increased, and the load to the internal combustion engine 2 is decreased, and, optionally, the second clutch 10 is disengaged. Following this, the current gear of the second subtransmission 6 is disengaged, and the shift element 13 is synchronized and engaged, wherein, subsequently, in the manner of a power shifting from the electric machine 3 back to the internal combustion engine 2, the load to the electric machine 3 is increased, and the load to the internal combustion engine 2 is decreased, and, optionally, the second clutch 10 is engaged. This function can be used when the second clutch 10 is friction-locking, or when the second clutch 10 is form-locking.

In order to execute a gear shifting from a current gear of the second subtransmission 6 to a target gear of the second subtransmission 6, using the electric machine 3 as a power shifting element, starting from an internal combustion engine driving mode of the motor vehicle, with the clutches 10, 11 engaged, and the form-locking shift element 13 disengaged, first, an intermediate gear is synchronized and engaged in the first subtransmission 5, subsequently the load to the electric machine 3 is increased and the load to the internal combustion engine 2 is decreased, and, optionally, the second clutch 10 is disengaged. Following this, the current gear is disengaged and the target gear is synchronized and engaged, wherein, subsequently, the load to the electric machine 3 is decreased, and the load to the internal combustion engine 2 is increased, and, optionally, the second clutch 10 is engaged. Following this, the intermediated gear is disengaged in the first subtransmission 5. This function can be used when the second clutch 10 is friction-locking, or when the second clutch 10 is form-locking.

As has already been explained in connection with FIG. 2, a secondary assembly, such as the oil pump 14 in FIG. 2, for example, can be connected to the first transmission input shaft 7 of the first subtransmission 5, between the electric machine 3 and the first, friction-locking clutch 11. When the clutches 10 and 11 are cooled and, optionally, actuated by means of this oil pump 14, a separate, electrically powered oil pump can be eliminated. This is then possible, if a start-up is executed by means of the slipping, first, friction-locking clutch 11. Furthermore, this is possible during pure electrical operation, because the oil pump 15 can be powered by the electric machine 3, even when the motor vehicle is at a standstill.

The electric machine 3 can also be connected to the drive shaft 15 of the electric machine via a constant transmission ratio. Then, when the form-locking shift element 13 and the first, friction-locking clutch 11 are both disengaged, the drive shaft 15 of the electric machine 3 can rotate freely.

REFERENCE SYMBOLS 1 hybrid drive
2 internal combustion engine
3 electric machine
4 transmission
5 first subtransmission
6 second subtransmission
7 first input shaft
8 second input shaft
9 output shaft
10 form-locking or friction-locking clutch
11 friction-locking clutch
12 shifting group
13 shift element
14 oil pump
15 drive shaft

The invention claimed is:

1. A hybrid drive for a motor vehicle, comprising an internal combustion engine, an electric machine and a transmission, wherein the transmission is a multi-stage shifting transmission comprising:
   a first subtransmission comprising a first input shaft; and
   a second subtransmission comprising a second input shaft, said first and second subtransmissions sharing a common output shaft,
   wherein the electric machine is coupled to the first input shaft of the first subtransmission, and the internal combustion engine is coupled to the second input shaft of the second subtransmission, and wherein the first and second input shafts are coupled selectively to the common output shaft via form-locking shift elements of the first and second subtransmissions,
   wherein the first input shaft of the first subtransmission is coupled to the electric machine via a first friction-locking clutch, in such a manner that when the first friction-locking clutch is engaged, the electric machine is coupled to the first input shaft, and thus to the first subtransmission, and when the first friction-locking clutch is disengaged, the electric machine is decoupled from the first input shaft, and thus from the first subtransmission,
   wherein the second input shaft of the second subtransmission is coupled to the internal combustion engine via a second clutch, in such a manner that when the second clutch is engaged, the internal combustion engine is coupled to the second input shaft, and thus to the second subtransmission, and when the second clutch is disengaged, the internal combustion engine is decoupled from the second input shaft, and thus from the second subtransmission, a drive shaft of the electric machine being connected to the second input shaft via a form-locking shift element.

2. The hybrid drive according to claim 1, wherein the form-locking shift element engages with the first input shaft between the electric machine and the first friction-locking clutch and with the second input shaft between the second clutch and the second subtransmission.

3. The hybrid drive according to claim 1, wherein when the form-locking shift element is engaged, and both the first friction-locking and the second clutches are disengaged, the electric machine is coupled exclusively to the second input shaft and thus to the second subtransmission.

4. The hybrid drive according to claim 1, wherein when the first friction-locking clutch is disengaged, and the form-locking shift element-as well as the second clutch are engaged, the electric machine and the internal combustion engine are coupled to one another, and coupled collectively to the second input shaft, and thus to the second subtransmission.

5. The hybrid drive according to claim 1, wherein when the second clutch is disengaged, and the form-locking shift element as well as the first friction-locking clutch, are engaged, the first and second subtransmissions are coupled to one another, and the electric machine is coupled to the first and second input shafts, and thus to the first and second subtransmissions.

6. The hybrid drive according to claim 1 wherein the first and second input shafts of the first and second subtransmissions are disposed coaxially to one another.

7. A method for operating a hybrid drive according to claim 1, comprising:
executing a gear shifting from a current gear of the first subtransmission to a target gear of the second subtransmission during a pure electrical driving mode via the first subtransmission, with the first clutch engaged, with the second clutch disengaged, and with the form-locking shift element disengaged, such that first, either according to a first variation, the form-locking shift element is synchronized and engaged, or according to a second variation, the target gear is synchronized and engaged in the second subtransmission; and
bringing the first friction-locking clutch to a slippage state, following which, in the first variation, the target gear is synchronized and engaged in the second subtransmission, or in the second variation, the form-locking shift element is synchronized and engaged, after which the first clutch is fully disengaged.

8. A method for operating a hybrid drive according to claim 1, comprising:
executing a gear shifting from a current gear of the second subtransmission to a target gear of the first subtransmission during a pure electrical driving mode via the second subtransmission, with the first friction-locking and the second clutches disengaged, and the form-locking shift element being engaged, such that first, the target gear is synchronized and engaged in the first subtransmission; and
freeing the second subtransmission of load by means of at least partially engaging the first friction-locking clutch and disengaging the current gear of the second subtransmission, and following this, engaging the first friction-locking clutch.

9. A method for operating a hybrid drive according to claim 1, during a pure electrical driving mode via the second subtransmission, with the first friction-locking and the second clutches disengaged and the form-locking shift element engaged, comprising:
executing a gear shifting from a current gear of the second subtransmission to a target gear of the first subtransmission while starting the internal combustion engine, such that first, the target gear is synchronized and engaged in the first subtransmission;
freeing the second subtransmission of load by means of at least partially engaging the first friction-locking clutch and the current gear of the second subtransmission being disengaged;
synchronizing subsequently the first friction-locking clutch, and at the same time, engaging at least partially the second-clutch for a tow-start of the internal combustion engine; and
disengaging after the tow-start of the internal combustion engine, the second clutch.

10. A method for operating a hybrid drive according to claim 1, when the motor vehicle is stationary, for a generator operating mode of the electric machine, comprising:
engaging the form-locking shift element;
engaging a start-up gear in the first subtransmission;
engaging a neutral setting in the second subtransmission;
engaging the second clutch and the first friction-locking clutch, at most to a contact point thereof, and, for the subsequent start-up, or creeping stage of the first friction-locking clutch, engaging the first friction-locking clutch beyond the contact point.

11. A method for operating a hybrid drive according to claim 1, during a pure electrical driving mode via the first subtransmission of the transmission, with the second clutch disengaged, with the first friction-locking clutch engaged, and with the form-locking shift element engaged, for starting the internal combustion engine of the hybrid drive, comprising:
synchronizing first and then engaging the form-locking shift;
bringing the first friction-locking clutch into a slippage, a rotational speed of the electric machine of the hybrid drive being increased; and
engaging the second clutch, the internal combustion engine of the hybrid drive being tow-started, and subsequently, engaging the first friction-locking clutch.

12. A method for operating a hybrid drive according to claim 1, for executing a gear shifting from a current gear of the first subtransmission to a target gear of the first subtransmission, comprising;
starting from an internal combustion engine driving mode of the motor vehicle, with the first friction-locking and second clutches engaged, and with the form-locking shift element engaged;
increasing first a load to the electric machine of the hybrid drive, and decreasing a load to the internal combustion engine of the hybrid drive;
disengaging the form-locking shift element;
synchronizing and then engaging an intermediate gear of the second subtransmission;
decreasing the load to the electric machine of the hybrid drive and increasing the load to the internal combustion engine of the hybrid drive;
disengaging subsequently the current gear of the first subtransmission, and synchronizing and then engaging the target gear, subsequently the load to the electric machine being increased, and the load to the internal combustion engine being decreased;
disengaging subsequently the intermediate gear of the second subtransmission, and synchronizing and then engaging the form-locking shift element; and
decreasing the load to the electric machine of the hybrid drive, and increasing the load to the internal combustion engine of the hybrid drive.

13. A method for operating a hybrid drive according to claim 1, for executing a gear shifting from a current gear of the first subtransmission of the transmission to a target gear of the second subtransmission of the transmission, comprising:
starting from an internal combustion engine driving mode of the motor vehicle, with the first friction-locking and second clutches engaged, and with the form-locking shift element engaged;
increasing a load to the electric machine, and decreasing a load to the internal combustion engine;
disengaging the form-locking shift element;
synchronizing and then engaging the target gear of the second subtransmission; and
decreasing the load to the electric machine of the hybrid drive and increasing the load to the internal combustion engine.

14. A method for operating a hybrid drive according to claim 1, for executing a gear shifting from a current gear of the second subtransmission of the transmission to a target gear of the first subtransmission of the transmission, comprising;
   starting from an internal combustion engine driving mode of the motor vehicle, with the first friction-locking and second clutches engaged, and with the form-locking shift element disengaged;
   synchronizing first and then engaging the target gear of the first subtransmission;
   increasing a load to the electric machine, and decreasing a load to the internal combustion engine;
   disengaging the current gear of the second subtransmission, and synchronizing and then engaging the form-locking shift element; and
   decreasing subsequently the load to the electric machine, and increasing the load to the internal combustion engine.

15. A method for operating a hybrid drive according to claim 1, for executing a gear shifting from a current gear of the second subtransmission to a target gear of the second subtransmission, comprising;
   starting from an internal combustion engine driving mode of the motor vehicle, with the first friction-locking and second clutches engaged, and with the form-locking shift element disengaged;
   synchronizing first an intermediate gear and the intermediate gear being engaged in the first subtransmission;
   increasing subsequently a load to the electric machine, and decreasing a load to the internal combustion engine;
   disengaging subsequently the current gear, and synchronizing and then engaging the target gear; and
   decreasing the load to the electric machine, and increasing the load to the internal combustion engine.

16. The hybrid drive according to claim 1, wherein the second clutch is a friction-locking or form-locking clutch.

17. The method for operating a hybrid drive according to claim 7, wherein in the second variation, the form-locking shift element is synchronized and engaged, after which the first friction-locking clutch is fully disengaged, and the current gear is disengaged in the first subtransmission.

18. The method for operating a hybrid drive according to claim 9, wherein after the tow-start of the internal combustion engine, the second clutch is again disengaged, and subsequently, the first friction-locking clutch is engaged.

19. A hybrid drive for a motor vehicle, comprising an internal combustion engine, an electric machine and a transmission, wherein the transmission is a multi-stage shifting transmission comprising:
   a first subtransmission comprising a first input shaft; and
   a second subtransmission comprising a second input shaft, said first and second subtransmissions sharing a common output shaft,
   wherein the electric machine is coupled to the first input shaft of the first subtransmission, and the internal combustion engine is coupled to the second input shaft of the second subtransmission, and wherein the first and second input shafts are coupled selectively to the common output shaft via form-locking shift elements of the first and second subtransmissions,
   wherein an oil pump is allocated to the first input shaft, the oil pump being powered when the motor vehicle is at a standstill,
   wherein the first input shaft of the first subtransmission is coupled to the electric machine via a first friction-locking clutch, in such a manner that when the first friction-locking clutch is engaged, the electric machine is coupled to the first input shaft, and thus to the first subtransmission, and when the first friction-locking clutch is disengaged, the electric machine is decoupled from the first input shaft, and thus from the first subtransmission,
   wherein the second input shaft of the second subtransmission is coupled to the internal combustion engine via a second clutch, in such a manner that when the second clutch is engaged, the internal combustion engine is coupled to the second input shaft, and thus to the second subtransmission, and when the second clutch is disengaged, the internal combustion engine is decoupled from the second input shaft, and thus from the second subtransmission, a drive shaft of the electric machine being connected to the second input shaft via a form-locking shift element.

20. A hybrid drive for a motor vehicle, comprising an internal combustion engine, an electric machine and a transmission, wherein the transmission is a multi-stage shifting transmission comprising:
   a first subtransmission comprising a first input shaft; and
   a second subtransmission comprising a second input shaft, said first and second subtransmissions sharing a common output shaft,
   wherein the electric machine is coupled to the first input shaft of the first subtransmission, and the internal combustion engine is coupled to the second input shaft of the second subtransmission, and wherein the first and second input shafts are coupled selectively to the common output shaft via form-locking shift elements of the first and second subtransmissions,
   wherein the first input shaft of the first subtransmission is coupled to the electric machine via a first friction-locking clutch, in such a manner that when the first friction-locking clutch is engaged, the electric machine is coupled to the first input shaft, and thus to the first subtransmission, and when the first friction-locking clutch is disengaged, the electric machine is decoupled from the first input shaft, and thus from the first subtransmission,
   wherein the second input shaft of the second subtransmission is coupled to the internal combustion engine via a second clutch, in such a manner that when the second clutch is engaged, the internal combustion engine is coupled to the second input shaft, and thus to the second subtransmission, and when the second clutch is disengaged, the internal combustion engine is decoupled from the second input shaft, and thus from the second subtransmission, a drive shaft of the electric machine being connected to the second input shaft via a form-locking shift element,
   wherein said form-locking shift elements of the first and second subtransmissions are actively synchronized via a rotational rate of the electric machine when the electric machine is connected to the first or the second subtransmission.

* * * * *